United States Patent
Nesbit

(10) Patent No.: US 10,728,219 B2
(45) Date of Patent: Jul. 28, 2020

(54) ENHANCING SECURITY OF COMMUNICATIONS DURING EXECUTION OF PROTOCOL FLOWS

(71) Applicant: R3 Ltd., London (GB)

(72) Inventor: Matthew Nesbit, London (GB)

(73) Assignee: R3 LTD., London (GB)

( * ) Notice: Subject to any disclaimer, the term of this patent is extended or adjusted under 35 U.S.C. 154(b) by 281 days.

(21) Appl. No.: 15/953,273

(22) Filed: Apr. 13, 2018

(65) Prior Publication Data

US 2019/0319928 A1    Oct. 17, 2019

(51) Int. Cl.
*H04L 29/06*    (2006.01)
*H04L 9/32*    (2006.01)
*H04L 29/08*    (2006.01)
*G06F 21/60*    (2013.01)
*H04L 9/08*    (2006.01)

(52) U.S. Cl.
CPC ........ *H04L 63/0281* (2013.01); *H04L 9/3263* (2013.01); *H04L 67/2809* (2013.01); *G06F 21/602* (2013.01); *H04L 9/0894* (2013.01); *H04L 63/0428* (2013.01); *H04L 69/329* (2013.01)

(58) Field of Classification Search
CPC .............. H04L 63/0281; H04L 9/3263; H04L 67/2809; H04L 9/0894; H04L 63/0428; H04L 69/329; H04L 51/00; H04L 63/0209; H04L 63/0442; H04L 63/062; H04L 63/0823; G06F 21/602; G06F 9/546; G06Q 30/06

See application file for complete search history.

(56) References Cited

U.S. PATENT DOCUMENTS 7,873,707 B1 *  1/2011  Subramanian .... H04L 29/12613
                                                    709/219
10,121,025 B1 * 11/2018  Rice ......................... H04L 9/30
                        (Continued)

FOREIGN PATENT DOCUMENTS

EP          2031817 A1     3/2009

OTHER PUBLICATIONS

International Search Report and Written Opinion issued for PCT/GB2019/051064 dated Jun. 7, 2019.
(Continued)

*Primary Examiner* — J. Brant Murphy
(74) *Attorney, Agent, or Firm* — Perkins Coie LLP

(57) ABSTRACT

A message interface system is provided that allows for local nodes to communicate with remote nodes securely. The message interface system provides a secure zone system that includes a reverse proxy server and a proxy server that interface with an internal firewall and an external firewall. The message interface system also includes a bridge system that is behind the internal firewall and that directs the secure zone system to establish connections with remote nodes, sends outbound messages of the local node to the proxy server for sending to the remote nodes, and receives inbound messages from the reverse proxy server sent from the remote nodes. The secure zone system helps ensure that the effects of a cyberattack are limited to the secure zone system without compromising business data of the local node.

25 Claims, 7 Drawing Sheets

(56) References Cited

U.S. PATENT DOCUMENTS

| | | | |
|---|---|---|---|
| 2002/0124090 A1* | 9/2002 | Poier | H04L 63/0272 709/228 |
| 2004/0044768 A1* | 3/2004 | Takahashi | H04L 29/06 709/225 |
| 2005/0226196 A1* | 10/2005 | Suh | H04W 4/029 370/338 |
| 2005/0251855 A1* | 11/2005 | Brandstatter | H04L 63/0209 726/12 |
| 2005/0273849 A1* | 12/2005 | Araujo | H04L 63/0281 726/12 |
| 2007/0297430 A1* | 12/2007 | Nykanen | H04W 12/0609 370/408 |
| 2012/0278487 A1* | 11/2012 | Woelfel | H04L 61/2596 709/226 |
| 2016/0088023 A1* | 3/2016 | Handa | G06F 16/957 726/1 |
| 2017/0070536 A1* | 3/2017 | Mortman | H04L 41/0893 |
| 2017/0289104 A1* | 10/2017 | Shankar | H04L 63/029 |
| 2017/0352012 A1 | 12/2017 | Hearn | |
| 2018/0219966 A1* | 8/2018 | Berard | H04L 63/0876 |
| 2018/0324204 A1* | 11/2018 | McClory | G06F 8/71 |
| 2019/0228144 A1* | 7/2019 | Kermes | H04L 63/0281 |
| 2019/0272291 A1* | 9/2019 | Imai | G06F 16/152 |

OTHER PUBLICATIONS

Wyatt, Rob T et al. "Secure Messaging Scenarios with WebSphere MQ" Nov. 1, 2012, pp. 1-366, https://www.redbooks.ibm.com/redbooks/pdfs/sg248069.pdf pp. 141-184.

Wyatt, Rob T "Securing Your Queue Manager" Dec. 31, 2012, pp. 1-75, https://t-rob.net/Downloads/20120501_1577-WebSphere_MQ_Securing_Your_Queue_Manager.pdf.

Hearn, Mike, Corda: A distributed ledger:, Nov. 29, 2016, https://docs.corda.net/releases/release-M10.1/_static/ordia-technical-whitepaper.pdf.

* cited by examiner

ENHANCING SECURITY OF COMMUNICATIONS DURING EXECUTION OF PROTOCOL FLOWS

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated.

When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node or cluster of nodes, for notarization. The notary maintains an UTXO database of unspent transaction outputs or alternatively spent transaction outputs. When a transaction is received, the notary checks the inputs to the transaction against the UTXO database to ensure that the outputs referenced by the inputs have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

Transactions between parties in a distributed ledger system can involve complex interactions between the nodes of the parties. To help support such transactions, a protocol framework that supports the development of protocol flows may be employed. A protocol flow (or simply "flow") is computer code that controls the performance of a transaction by the party or parties to the transaction. Protocol flows can be developed for different types of transactions, such as a transaction to sell an asset from a selling party to a buying party, a transaction to support an interest rate swap, a transaction involving more than two parties, and so on. An example will help illustrate a protocol flow. In this example, a "transfer" transaction specifies to transfer a certain amount of money from an "originator" party to a "responder" party. To support such a transfer transaction, a transfer protocol flow may be developed that includes computer code for the party in the role of the originator ("originator code") and computer code for the party in the role of responder ("responder code"). When the two parties agree to consummate the transaction, they agree on the particulars of the transaction, such as the amount of money to transfer, the notary who is responsible for notarizing the transaction, and the use of the transfer protocol flow.

Continuing with the example of the transfer transaction, to record the transfer transaction, the originator party starts execution of the originator code of the transfer protocol flow, and the responder party starts execution of the responder code of the transfer protocol flow. The originator party provides the particulars of the transaction to the originator code. The originator code then sends to the responder party its public key and the particulars of the transaction. Upon receiving the public key and the particulars of the transaction, the responder code verifies the particulars of the transaction (e.g., prompting a user to confirm the price), generates a proposed transaction that outlines the particulars of the transaction, signs the proposed transaction with the signature of the responder party (e.g., using a private key of the responder party), and sends the proposed transaction to the originator code. The proposed transaction specifies the input state and the output state and identifies a notary. The input state may specify the funds used to buy the asset, and the output state may specify that ownership of the asset has been transferred. The input state and the output state include contract code that is used to verify whether the transaction is valid. Upon receiving the proposed transaction, the originator code verifies the proposed transaction by verifying that the proposed transaction was signed by the responder party (e.g., using the public key of the responder party), verifying that the particulars of the proposed transaction match those sent to the responder party, and executing the contract code of the input state and output state of the proposed transaction to determine whether the proposed transaction is valid according to the contract code. When the proposed transaction is valid, the originator code accepts the proposed transaction by signing the proposed transaction with the signature of the originator party to generate an accepted transaction. The originator code then sends the accepted transaction to notary code of the notary specified in the proposed transaction. The notary code may be considered computer code of the transfer protocol code for the role of notary. Execution of the notary code may have started when the parties decided to consummate the transaction. Execution of the code of the transfer protocol flows continues by the parties as described in U.S. Patent Application Publication Number US2017/0352012A1, entitled "Secure Processing of Electronic Transactions by a Decentralized, Distributed Ledger System," with the applicant of R3 Ltd., and published on Dec. 7, 2017, which is hereby incorporated by reference. This patent publication provides an example of a protocol framework.

Cyberattacks cost companies and individuals billions of dollars. A report in 2015 estimated that cyberattacks cost companies over $400 billion annually. In addition to the financial costs, cyberattacks may result in other damages such as the destruction of valuable information, the release of sensitive information, and so on. The costs and damages will surely increase over time without effective defenses. Cyberattacks often rely on malicious software, referred to as "malware," which is installed and executed by a computer that is the target of the attack. The executing malware orchestrates the attack. For example, a ransomware attack may encrypt all the data on a computer, including the only copies of financial documents, family photographs, electronic mail messages, and so on. If the ransom is not paid, then the data may remain encrypted forever. Even if the ransom is paid, the attacker might not provide the key to decrypt the data. As another example, if an organization's node of a distributed ledger system is the subject of a successful cyberattack, the attacker may be able to create transactions and record the transactions in a way that steals assets (e.g., account information, trade secrets, customer lists, private keys, and other business data) from the organization, enter into contracts with other organizations, and so on. Because of the high costs of cyberattacks, companies and individuals expend considerable resources in developing and purchasing security systems as defenses to cyberattacks.

DETAILED DESCRIPTION

Figure 1:
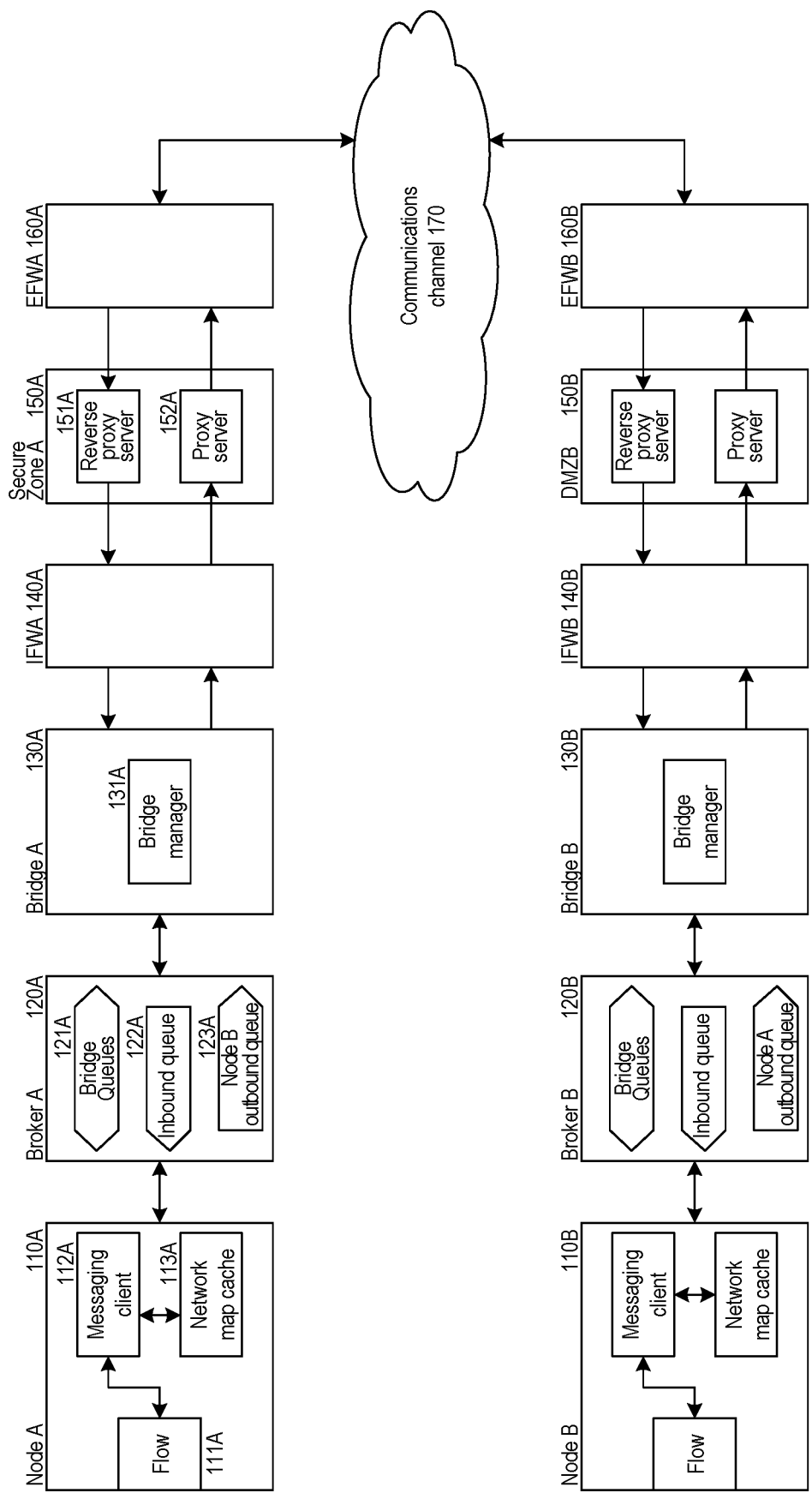
FIG. 1 is a block diagram that illustrates components of a message interface system in some embodiments.

A method and system for securely communicating between a local node and a remote node using a message queuing protocol is provided. In some embodiments, a message interface system interfaces with a local node to support communicating with a remote node. The message interface system provides a mechanism for a remote node to send messages to the local node without establishing a direct connection with the local node. The message interface system provides various mechanisms to help shield the local node from a cyberattack that would otherwise be a direct attack on the local node. The message interface system implements an architecture that helps ensure that a cyberattack cannot compromise the local node to gain access to data (e.g., business data) stored by or otherwise accessible to the local node or the data sent to and received from the remote node. To help minimize the effects of a cyberattack, the message interface system may include a broker system, a bridge system, an internal firewall, a secure zone system, and an external firewall. Alternatively, the message interface system may be considered to interface with, rather than include, the broker system. The broker system implements the message queuing protocol, which may be compatible with the Advanced Message Queuing Protocol ("AMQP") with the broker system being an AMQP broker.

In some embodiments, the broker system provides an outbound queue for storing messages received from the local node to be sent to the remote node and an inbound queue for storing messages received from the remote node to be sent to the local node. When a local node, such as a Corda node, starts up, the local node directs the broker system to create an outbound queue and an inbound queue for sending messages to and receiving messages from the remote node. A separate outbound queue may be created for each remote node for storing messages sent to that remote node and a single inbound queue for storing messages received from any of the remote nodes. The broker system interfaces with the bridge system to send messages to and receive messages from the remote nodes. The broker system implements the messaging queuing protocol, which may include ensuring delivery of messages sent to the remote nodes and confirming receipt of messages sent from the remote nodes.

In some embodiments, the bridge system receives from the local node a notification of the outbound queues and the inbound queue provided by the broker system. The bridge system subscribes to the outbound queues, for example, using a publisher/subscriber model so that the bridge system receives messages published by the broker system that are to be sent to remote nodes. The bridge system also receives from the local node connection information for establishing outbound and inbound connections with remote nodes. The connection information may include the Internet Protocol ("IP") address and the port number of a remote node, the public key certificate of the remote node, and a private key corresponding to a public key. The public key may be registered with a certificate authority so that remote nodes can obtain the corresponding certificate to use in verifying a signature based on the private key. The certificate can then be published so it is accessible to remote nodes. A private/public key pair may be generated specifically for use by the message interface system so that private keys of the local node (e.g., private keys used to encrypt and sign data) are not provided to the message interface system to reduce the risk of the private keys being compromised. The private key may be referred to as a secure zone signing key.

To initiate connections to remote nodes, the bridge system sends the secure zone signing key through the internal firewall to a proxy server of the secure zone system. For each outbound queue for a remote node, the bridge system initiates a connection to the remote node by sending an initiate connection message that includes the IP address, port number, and public key certificate of the remote node through the internal firewall to the proxy server. To accept connections from remote nodes, the bridge system sends the secure zone signing key through the internal firewall to a proxy server of the secure zone system. In some embodiments, the proxy server may share the secure zone signing key and public key certificates of remote nodes sent to a reverse proxy server, or vice versa. In such a case, the bridge system need only send the secure zone signing key and public key certificate to the proxy server or the reverse proxy server. The bridge system may also send an accept connection message that includes a secure zone signing key and a public key certificate of the remote node through the internal firewall to a reverse proxy server to allow the reverse proxy server to accept connection requests from the remote node on behalf of the local node. After the connection is established with a remote node, the bridge system receives outbound messages from the outbound queue for that remote node and sends the outbound messages through the internal firewall to the proxy server. After the remote node establishes a connection to the reverse proxy server, the bridge system receives from the reverse proxy server through the internal firewall inbound messages sent from remote node. The bridge system thus acts as a bridge between the broker system and the secure zone system.

In some embodiments, the secure zone system is logically located between the internal firewall and the external firewall. The secure zone system helps ensure that any attempt to compromise security is countered by the secure zone system to prevent the local node from being compromised. The secure zone system may be considered to provide what is referred to in the security industry as a demilitarized zone ("DMZ"). The internal firewall is also referred to as a "back-end" firewall, and the external firewall is also referred to as a "front-end" or "perimeter" firewall. The message interface system thus provides what is referred to as a dual firewall system. The firewalls are configured to limit connections to those via approved ports and connection types (e.g., Transport Layer Security ("TLS") connections). To ensure the security of the local node and messages sent and received, the secure zone system does not store business data of the local node. Moreover, the outbound messages are encrypted by the local node prior to leaving the local node, and inbound messages are encrypted by the remote nodes and decrypted only by the local node.

In some embodiments, the secure zone system provides a reverse proxy server and a proxy server. The reverse proxy server receives through the internal firewall from the bridge system a secure zone signing key and accept messages to accept inbound connections. The reverse proxy server stores the secure zone signing key and the public certificates of the accept messages. The reverse proxy server responds to connect messages sent from the remote nodes through the external firewall and allows inbound connections only with authorized remote nodes as indicated by accept messages received from the bridge system. After an inbound connection with a remote node is established, the reverse proxy server receives messages from remote nodes, ensures that the messages are authorized to be sent to the local node, and forwards the authorized messages through the internal firewall to the bridge system. The reverse proxy server also receives from the bridge system through the internal firewall acknowledgment messages that originate from the broker system and sends the acknowledgment messages through the external firewall to the remote node. The reverse proxy server does not store state relating to prior inbound messages so that if the secure zone system is compromised, information relating to prior messages cannot be accessed.

In some embodiments, the proxy server receives from the bridge system through the internal firewall initiate messages to establish outbound connections to remote nodes. The proxy server sends through the external firewall corresponding connection requests to the remote nodes. After a connection is established with a remote node, the proxy server receives from the bridge system through the internal firewall outbound messages and forwards the outbound messages to the remote node through the external firewall. The proxy server also receives acknowledgments from the remote nodes and forwards the acknowledgments through the internal firewall to the bridge system.

The message interface system may interface with multiple local nodes, rather than just one local node. In such a case, the broker system may provide, for each local node, an inbound queue and an outbound queue for each remote node that that local node is to send messages to. Alternatively, the broker system may provide one outbound queue for each remote node that is shared by the local nodes. Each local node may have access to a data store of remote node connection information, referred to as a network map cache. The network map cache stores a record for each remote node that the local node is to communicate with. Each record stores connection information for a remote node such as IP address and port number, public key certificate, inbound and outbound queue names, and so on. When a remote node starts up, it uses the information of the network map cache to direct the broker system to create the appropriate queues and to inform the bridge system of the connections to remote nodes that are to be initiated and accepted. A local node may also provide to the bridge system a list of allowed topics (e.g., AMQP topics) so that the bridge system can filter out inbound messages that are not for the allowed topics. After startup, a local node may also dynamically direct the broker system to create queues and to inform the bridge system to establish connections to new remote nodes based on updates to the network map cache, for example, as new remote nodes come online. A local node subscribes to the inbound queue of the broker system to receive inbound messages. When sending an outbound message to a remote node, a local node directs the broker system to add the message to the outbound queue for that remote node. The local node may maintain local queues for queuing outbound messages when the broker system is unavailable. When an inbound message is received from a remote node, the local node is notified and retrieves the inbound message from the inbound queue provided by the broker system.

The message interface system provides many advantages over existing connection techniques. The message interface system allows connections to a local node without requiring direct connections to the local node from a remote node and without requiring the local node to have a public IP address. The dual firewall design can be used to limit access to the secure zone system to only authorized IP addresses and ports, and the number of open ports can be very limited. The proxy server and the reverse proxy server may be multi-homed with separate network cards connected to the internal firewall and the external firewall to further enhance security. The secure zone system does not initiate connections through the internal firewall; rather, all connections through the internal firewall are initiated from the bridge system. So if the secure zone system is compromised, the compromised system cannot establish a connection through the internal firewall. No data (e.g., business data or other sensitive data) of the local node is stored in clear form by the secure zone system. The secure zone system uses communications protocols, such as TLS, that require storing of connection-specific certificates and keys (e.g., a symmetric key for each connection). Thus, if a certificate or key is compromised, it has no value other than with use of the specified connection. Thus, if one connection is compromised, other connections are not necessarily also compromised. The secure zone system does not have access to the local nodes or any other device of the internal network and communicates only with the bridge system, and the communications are through the internal firewall.

FIG. 1 is a block diagram that illustrates components of a message interface system in some embodiments. Node A 110A is adapted to communicate with node B 110B via communications channel 170, such as the Internet. Node A communicates via message interface system components including a broker system A 120A, a bridge system A 130A, an internal firewall A 140A, a secure zone system A 150A, and an external firewall A 160A. Node B communicates via similar message interface components 120B-160B. Node A includes a flow component 111A, a messaging client component 112A, and a network map cache 113A. The flow component implements, for example, Corda flows for directing communications with Node B. The messaging client component coordinates the sending of messages between the flow component and broker system A. The messaging client component accesses the network map cache that contains information on the remote nodes that note A is to connect to. The network map cache includes information such as the IP address and port number through which Node A is to connect to a remote node, certificate information for remote nodes, and so on. The broker system A includes bridge queues 121A that include an input queue and an output queue, referred to as bridge queues, for sending control messages between Node A and bridge system A. The broker system A also includes an inbound queue 122A and an outbound queue 123A for communicating with Node B. The broker system A may include an outbound queue for each remote node. The bridge system A includes a bridge manager component 131A. The bridge manager component exchanges messages with Node A via the bridge queues of the broker system A. The secure zone system A includes a reverse proxy server A 151A and a proxy server 152A. Although not illustrated, the message interface system may provide one or more failover systems for a primary system such as for a primary bridge system and a primary reverse proxy server and a primary proxy server. If a primary system is unavailable, then the corresponding failover system can access the current state of the unavailable system and perform the function of that now-unavailable system.

The computing systems (e.g., network nodes or collections of network nodes) on which the message interface system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the message interface system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The message interface system may be described in the general context of computer-executable instructions, such as program modules and components, executed by one or more computers, processors, or other devices. Generally, program modules or components include routines, programs, objects, data structures, and so on that perform tasks or implement data types of the message interface system. Typically, the functionality of the program modules may be combined or distributed as desired in various examples. Aspects of the message interface system may be implemented in hardware using, for example, an application-specific integrated circuit ("ASIC") or field programmable gate array ("FPGA").

Figure 2:
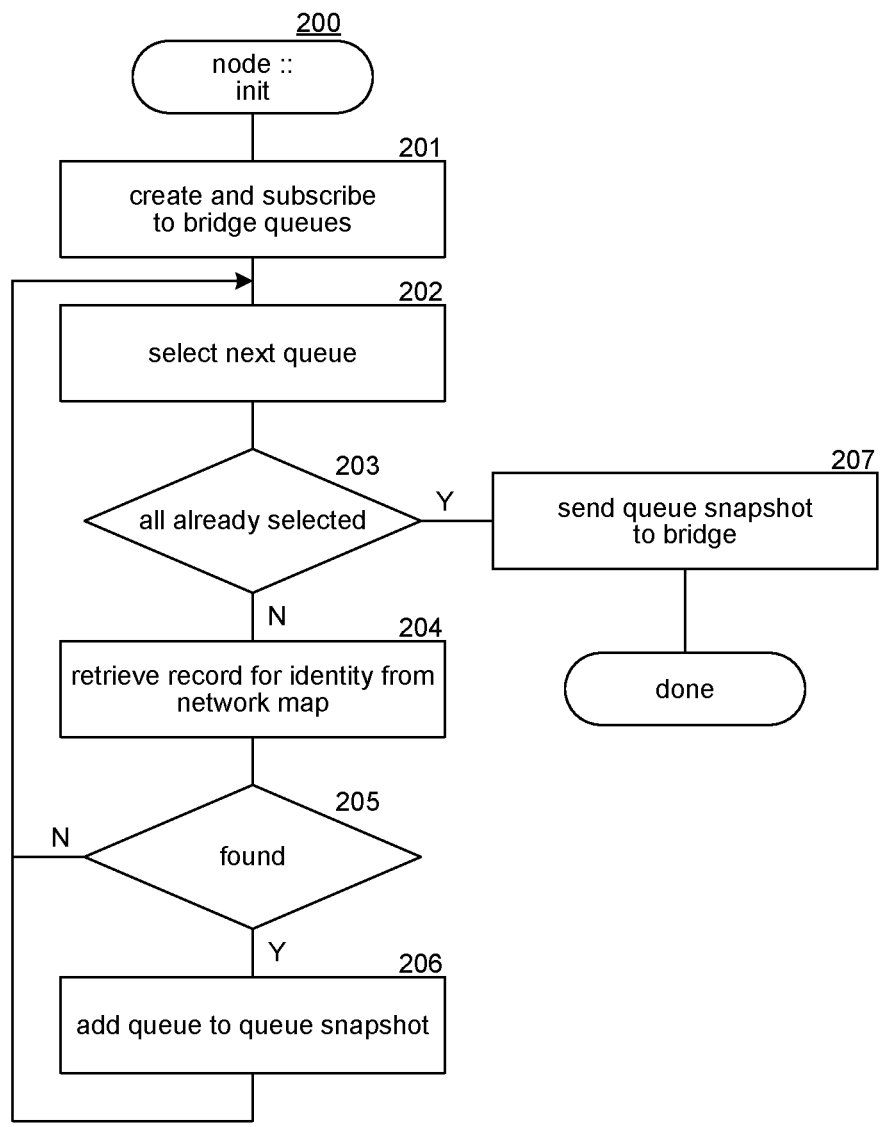
FIG. 2 is a flow diagram that illustrates the processing of an initialize component of a local node in some embodiments.

FIG. 2 is a flow diagram that illustrates the processing of an initialize component of a local node in some embodiments. The initialize component 200 is invoked to initialize communications with remote nodes. In block 201, the component interacts with the broker system to create and subscribe to the bridge queues for communicating with the bridge system. The component also receives an enumeration of the inbound and outbound queues of the broker system. In block 202, the component selects the next queue. In decision block 203, if all the queues have already been selected, then the component continues at block 207, else the component continues at block 204. In block 204, the component accesses the network map cache to retrieve a record for the identity associated with the queue. In decision block 205, if the record is found, then the local node is authorized to communicate with the remote node associated with the queue and the component continues at block 206, else the component loops to block 202 to select the next queue. In block 206, the component adds the queue to a queue snapshot message and then loops to block 202 to select the next queue. In block 207, the component adds information for other remote nodes that the local node is to communicate with to the queue snapshot message and sends the queue snapshot message to the bridge component via the bridge queue and the completes. The queue snapshot message contains information sufficient for the bridge component to establish a connection with the remote node associated with the queue. The component may also be invoked in response to receiving a message from the bridge system to provide a queue snapshot message.

Figure 3:
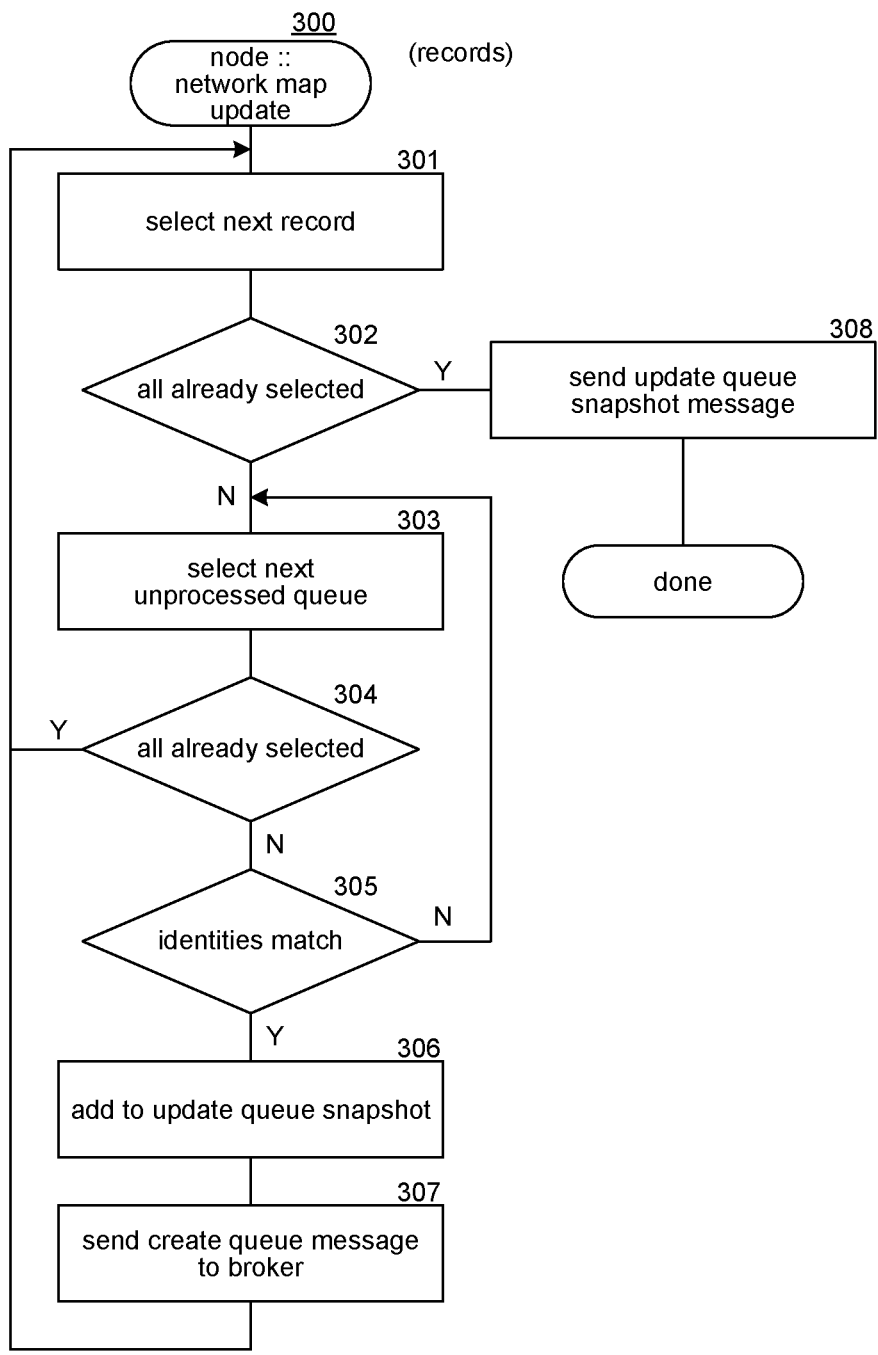
FIG. 3 is a flow diagram that illustrates processing of a network map update component in some embodiments.

FIG. 3 is a flow diagram that illustrates processing of a network map update component in some embodiments. The network map update component 300 of a node is invoked to process updates to the network map cache. The component is passed an indication of the records to be updated. In block 301, the component selects the next record. In decision block 302, if all the records have already been selected, then the component continues at block 308, else the component continues at block 303. In block 303, the component selects the next unprocessed queue. In decision block 304, if all the unprocessed queues have already been selected and processed for the selected record, then the component loops to block 301 to select the next record, else the component continues at block 305. In decision block 305, if the identity of the record matches that of the queue, then the component continues at block 306, else the component loops to block 303 to select the next unprocessed queue. In decision block 306, the component adds connection information to an update queue snapshot message. In block 307, the component sends a create queue message to the broker system to create a queue for the remote node identified by the record and loops to block 301 to select the next record. In block 308, the component sends the update queue snapshot message to the bridge system and then completes.

Figure 4:
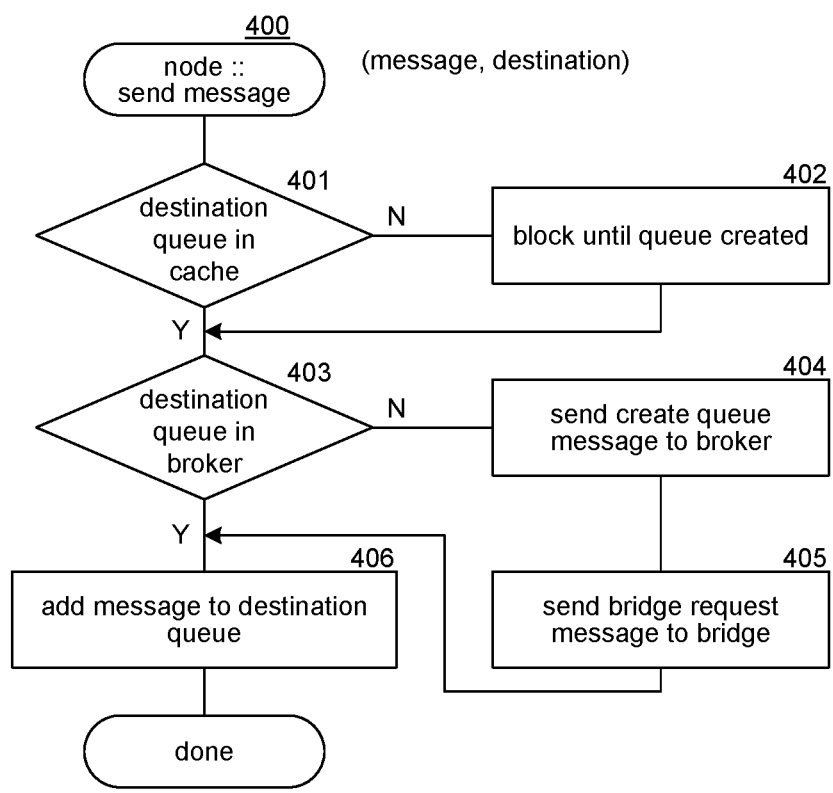
FIG. 4 is a flow diagram that illustrates the processing of a send message component of the local node in some embodiments.

FIG. 4 is a flow diagram that illustrates the processing of a send message component of the local node in some embodiments. The send message component 400 is passed an indication of a message and a remote node and coordinates the sending of the message to the remote node. In decision block 401, if the outbound queue for the remote node is identified in the network map cache indicating that the connection information for the remote node is available, then the component continues at block 403, else the component continues at block 402. In block 402, the component blocks until an outbound queue is created based on an update to the network map cache. In decision block 403, if the outbound queue has been created by the broker system, then the component continues at block 406, else the component continues at block 404. In block 404, the component sends a queue create message that includes the connection information to the broker system to create an outbound queue for the remote node. In block 405, the component sends a bridge request message to the bridge system to notify the bridge that the outbound queue has been created. The bridge system can then subscribe to the outbound queue and establish a connection with the remote node via the proxy server. In block 406, the component adds the message to the outbound queue for the remote node. In some embodiments, the processing of blocks 404 and 405 can be performed in parallel with block 406. The component then completes.

Figure 5:
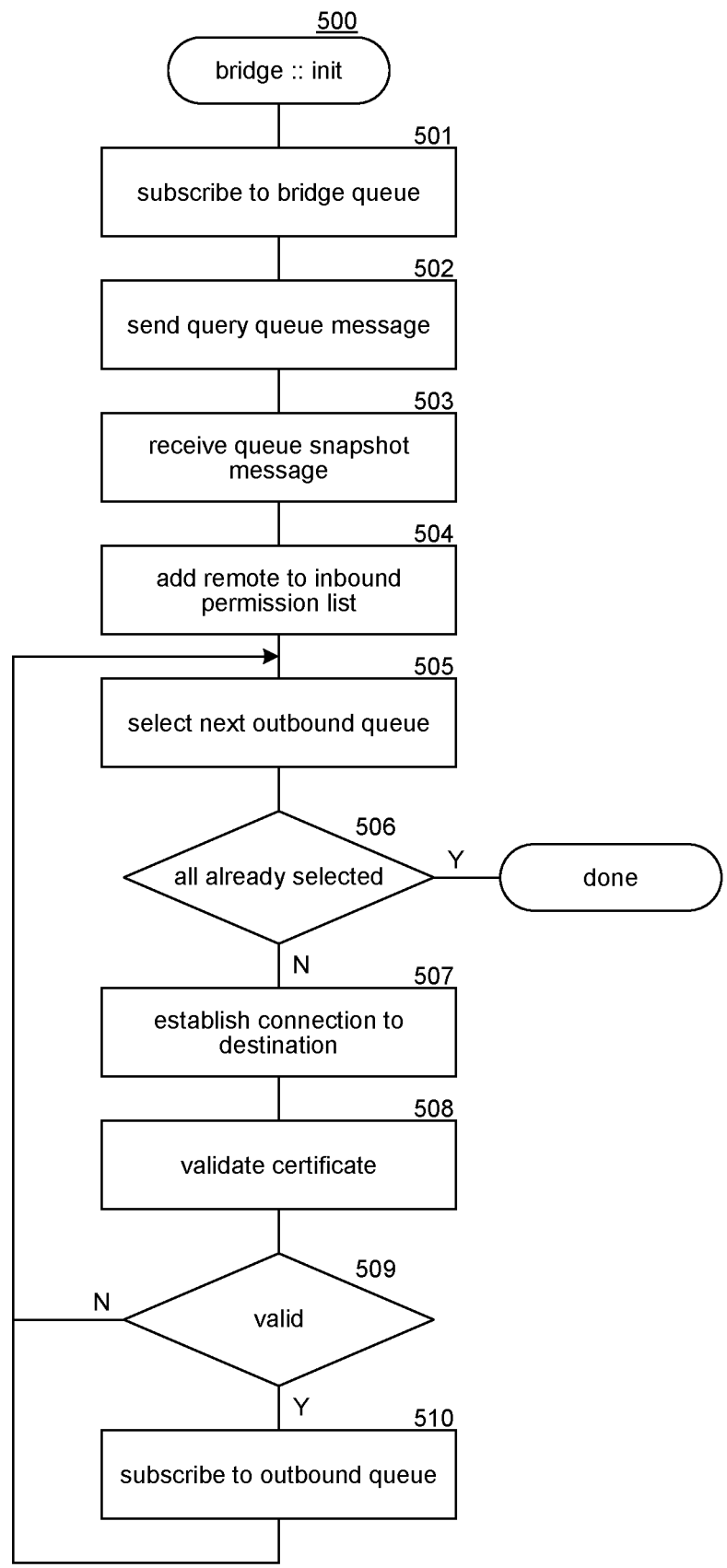
FIG. 5 is a flow diagram that illustrates the processing of an initialize component of the bridge system in some embodiments.

FIG. 5 is a flow diagram that illustrates the processing of an initialize component of the bridge system in some embodiments. The initialize component 500 is invoked when the bridge system is initialized. In block 501, the component subscribes to the bridge queue of the broker system to receive messages sent from the local node. In block 502, the component sends a query queue message to the local node via the bridge queue to request information on the queues created by the broker system. In block 503, the component receives a queue snapshot message from the local node. In block 504, the component adds the remote nodes to an inbound permissions list to be checked when a message is received from a remote node. In block 505, the component selects the next outbound queue of the queue snapshot message. In decision block 506, if all the outbound queues have already been selected, then the component completes, else the component continues at block 507. In block 507, the component directs the proxy server to establish a connection with the remote node. In block 508, the component validates the certificate provided by the remote node. In decision block 509, if the certificate is valid, then the component continues at block 510, else the component loops to block 505 to select the next outbound queue. The component may also send a message to the local node indicating that the connection cannot be established. In block 510, the component subscribes to the outbound queue and then loops to block 505 to select the next outbound queue. In some embodiments, the processing of blocks 505-510 can be performed in parallel for each outbound queue. For example, a separate thread of execution can be created for each outbound queue. Also, if a connection is lost, the bridge system unsubscribes from the outbound queue and repeatedly attempts to establish a connection with the remote node.

Figure 6:
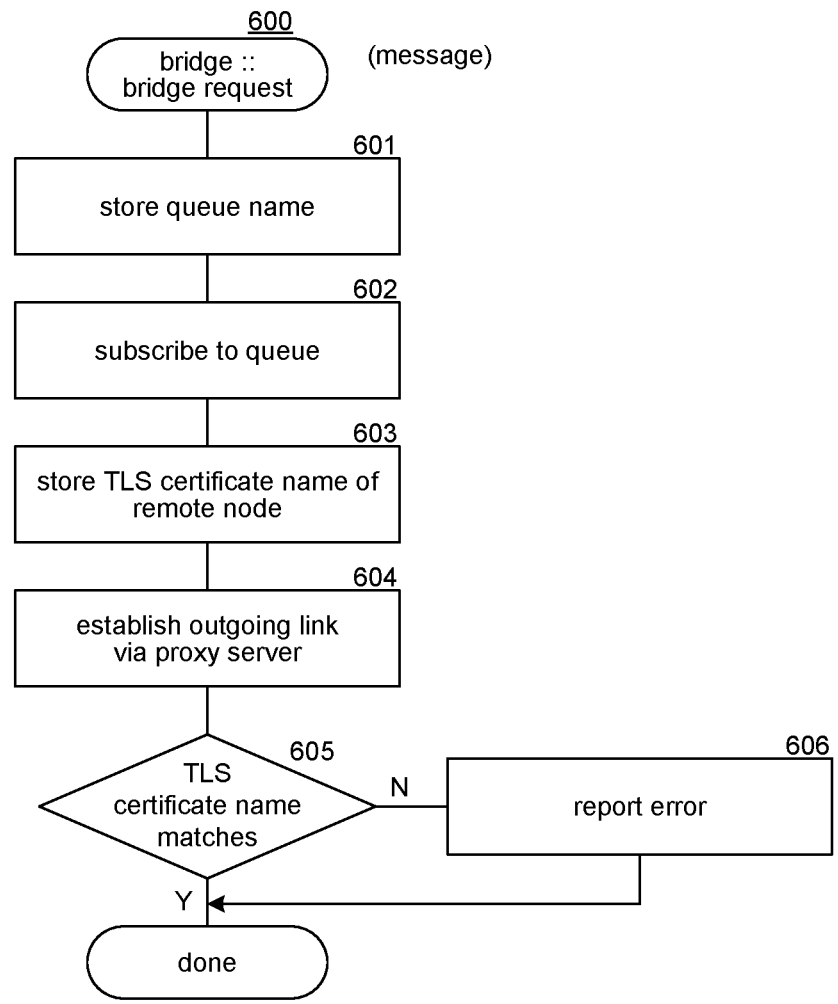
FIG. 6 is a flow diagram that illustrates the processing of a bridge request component of the bridge system in some embodiments.

FIG. 6 is a flow diagram that illustrates the processing of a bridge request component of the bridge system in some embodiments. The bridge request component 600 receives a notification that an outbound queue has been created for a remote node and coordinates the establishing of a connection with that remote node. In block 601, the component stores the name of the outbound queue for the remote node. In block 602, the component subscribes to the outbound queue. In block 603, the component stores the TLS certificate name for the remote node. In block 604, the component establishes an outgoing connection with the remote node via the proxy server. In decision block 605, if the TLS certificate name provided by the proxy server matches that of the message, then the component completes, else the component reports an error in block 606 and then completes.

Figure 7:
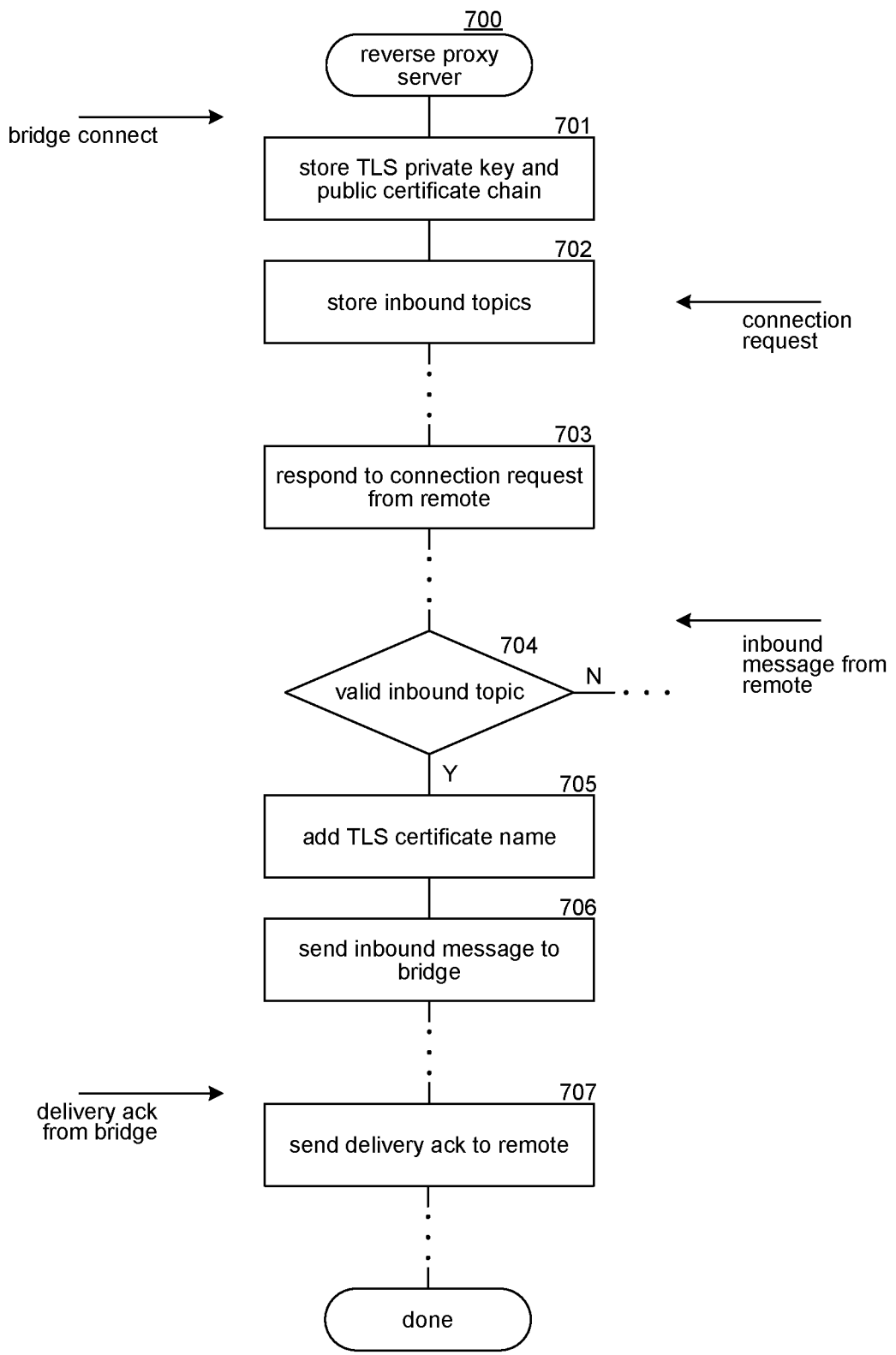
FIG. 7 is a flow diagram that illustrates the processing of a reverse proxy server component in some embodiments.

FIG. 7 is a flow diagram that illustrates the processing of a reverse proxy server component in some embodiments. The reverse proxy server component 700 initializes upon receiving a bridge connect message from the bridge system. In block 701, the component stores only an in-memory copy of the TLS private key and public certificate chain received in the bridge connect message. When the reverse proxy server disconnects from the bridge system, the component clears the in-memory copy. In block 702, the component stores an inbound topic associated with the connection. Eventually, a connection request is received from a remote node. In block 703, the component responds to the connection request from the remote node to coordinate the establishing of the connection, assuming that the certificate of the remote node is that of an authorized remote node and that the public certificate chain for the remote is valid. After the connection is established, the component receives an inbound message from the remote node. In block 704, the component validates that the topic of the inbound message matches an authorized topic. If the topic is not authorized, then the component processes an error and waits for a subsequent inbound message. If the topic is authorized, the component continues at block 705. The authorized topics may be provided by the bridge system. In block 705, the component adds a TLS certificate name to the message. In block 706, the component sends the inbound message via the internal firewall to the bridge system. The component waits for a delivery acknowledgment from the bridge system. In block 707, upon receiving the delivery acknowledgment, the component sends a delivery acknowledgment to the remote node and then continues to process the next received inbound message.

The following paragraphs describe various embodiments of aspects of the message interface system. An implementation of the message interface system may employ any combination of the embodiments. The processing described below may be performed by a computing system with a processor that executes computer-executable instructions stored on a computer-readable storage medium that implements the message interface system.

In some embodiments, a message interface system for a local node supporting communications between the local node and a remote node is provided. The message interface system comprises one or more computer-readable storage mediums storing computer-executable instructions and one or more processors for executing the computer-executable instructions stored in the one or more computer-readable storage mediums. The instructions include instructions of a broker system, a bridge system, an internal firewall, a secure zone system, and an external firewall. The broker system provides an outbound queue for storing messages received from the local node to be sent to the remote node and an inbound queue for storing messages received from the remote node to be sent to the local node. The bridge system subscribes to the outbound queue, initiates a connection through the internal firewall to a reverse proxy server of the secure zone system and a proxy server of the secure zone system, sends through the internal firewall to the reverse proxy server a secure zone signing key, receives outbound messages from the outbound queue, sends the outbound messages through the internal firewall to the proxy server, receives inbound messages through the internal firewall from the reverse proxy server, and sends the inbound messages to the inbound queue. The secure zone system comprises the reverse proxy server and the proxy server. The reverse proxy server, which stores the secure zone signing key, responds to a connection request received through the external firewall from the remote node using the secure zone signing key, receives inbound messages through the external firewall from the remote node, and sends the inbound messages through the internal firewall to the bridge system. The reverse proxy server does not store state relating to prior inbound messages. The proxy server, sends a connection request through the external firewall to the remote node, receives outbound messages through the internal firewall from the bridge system, and sends the outbound messages through the external firewall to the remote node. In some embodiments, the inbound queue and the outbound queue have names derived from a certificate name of the local node. In some embodiments, the reverse proxy server validates the connection request based on a certification of a valid node of a network of peer-to-peer nodes. In some embodiments, the broker system provides a bridge inbound queue and a bridge outbound queue to enable the local node and the bridge system to exchange messages. In some embodiments, the bridge system sends to the local node a queue request message for the identification of an inbound queue and outbound queues and receives from the local node an indication of the inbound queue and the outbound queues. In some embodiments, the message interface system connects to multiple local nodes. In some embodiments, the secure zone system includes a failover reverse proxy server. In some embodiments, the message interface system includes a failover bridge system. In some embodiments, the local node and the remote node implement a flow of a Corda network. In some embodiments, the local node queues outbound messages if the message interface system is unavailable. In some embodiments, the broker system creates the outbound queue and the inbound queue in response to a request of the local node. In some embodiments, the reverse proxy server validates the bridge system. In some embodiments, the reverse proxy server, upon receiving an inbound message, validates that the inbound message is directed to a valid inbound queue.

In some embodiments, a method performed by a secure zone system supporting communications between a local node and a remote node using a message queuing protocol is provided. The method, under control of a reverse proxy server of the secure zone system, receives a secure zone signing key through an internal firewall, responds to a connection request received from the remote node through an external firewall using the secure zone signing key, receives inbound messages from the remote node through the external firewall, and sends the inbound messages to the local node through the internal firewall. The reverse proxy server does not store state relating to prior inbound messages. The method, under control of a proxy server of the secure zone system, sends a connection request to the remote node through the external firewall, receives outbound messages from the local node through the internal firewall, and sends the outbound messages to the remote node through the external firewall. In some embodiments, the proxy server sends the connection request in response to receiving a connection request from the remote node. In some embodiments, the message queuing protocol is compatible with an AMQP. In some embodiments, the secure zone system interfaces with an AMQP bridge manager through the internal firewall and the AMQP bridge manager interfaces with an AMQP broker. In some embodiments, the secure zone system includes a failover reverse proxy server. In some embodiments, the local node and the remote node implement a flow of a Corda network.

In some embodiments, a secure zone system supporting communications between a local node and a remote node using a message queuing protocol is provided. The secure zone system includes a reverse proxy server that receives a secure zone signing key, receives an inbound connection from the remote node through an external firewall, establishes a connection with the remote node using the secure zone signing key, receives inbound messages from the remote node through the external firewall, and sends the inbound messages to the local node through an internal firewall. The reverse proxy server does not store state relating to prior inbound messages. The secure zone system also includes a proxy server that sends an inbound connection to the remote node through the external firewall, establishes a connection with the remote node, receives outbound messages from the local node through the internal firewall, and sends the outbound messages to the remote node via the external firewall. In some embodiments, the message queuing protocol is compatible with an AMQP. In some embodiments, the secure zone system interfaces with an AMQP bridge manager through the internal firewall and the AMQP bridge manager interfaces with an AMQP broker. In some embodiments, the local node sends outbound messages to and receives inbound messages from the remote node via the AMQP broker. In some embodiments, the secure zone system includes a failover reverse proxy server. In some embodiments, the local node and the remote node implement a flow of a Corda network.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a secure zone system supporting communications between a local node and a remote node using a message queuing protocol, the method comprising:
    under control of a reverse proxy server of the secure zone system, receiving a secure zone signing key through an internal firewall;
        responding to a connection request received from the remote node through an external firewall using the secure zone signing key;
        receiving inbound messages from the remote node through the external firewall; and
        sending the inbound messages to the local node through the internal firewall,
        wherein the reverse proxy server does not store state relating to prior inbound messages; and
    under control of a proxy server of the secure zone system, sending a connection request to the remote node through the external firewall;
        receiving outbound messages from the local node through the internal firewall; and
        sending the outbound messages to the remote node through the external firewall.

2. The method of claim 1 wherein the proxy server sends the connection request in response to receiving a connection request from the remote node.

3. The method of claim 1 wherein the message queuing protocol is compatible with an Advanced Message Queuing Protocol ("AMQP").

4. The method of claim 3 wherein the secure zone system interfaces with an AMQP bridge manager through the internal firewall, wherein the AMQP bridge manager interfaces with an AMQP broker.

5. The method of claim 1 wherein the secure zone system includes a failover reverse proxy server.

6. The method of claim 1 wherein the local node and the remote node implement a flow of a Corda network.

7. A message interface system for a local node supporting communications between the local node and a remote node, the message interface system comprising:
    one or more computer-readable storage mediums storing computer-executable instructions of:
        a broker system, a bridge system, an internal firewall, a secure zone system, and an external firewall, wherein:
            the broker system provides an outbound queue for storing messages received from the local node to be sent to the remote node and an inbound queue for storing messages received from the remote node to be sent to the local node;
            the bridge system subscribes to the outbound queue, initiates a connection through the internal firewall to a reverse proxy server of the secure zone system and a proxy server of the secure zone system, sends through the internal firewall to the reverse proxy server a secure zone signing key, receives outbound messages from the outbound queue, sends the outbound messages through the internal firewall to the proxy server, receives inbound messages through the internal firewall from the reverse proxy server, and sends the inbound messages to the inbound queue; and
            the secure zone system comprises the reverse proxy server and the proxy server, wherein
                the reverse proxy server, which stores the secure zone signing key, responds to a connection request received through the external firewall from the remote node using the secure zone signing key, receives inbound messages through the external firewall from the remote node, and sends the inbound messages through the internal firewall to the bridge system, wherein the reverse proxy server does not store state relating to prior inbound messages; and
                the proxy server, sends a connection request through the external firewall to the remote node, receives outbound messages through the internal firewall from the bridge system, and sends the outbound messages through the external firewall to the remote node; and
    one or more processors for executing the computer-executable instructions stored in the one or more computer-readable storage mediums.

8. The message interface system of claim 7 wherein the inbound queue and the outbound queue have names derived from a certificate name of the local node.

9. The message interface system of claim 7 wherein the reverse proxy server validates the connection request based on a certification of a valid node of a network of peer-to-peer nodes.

10. The message interface system of claim 7 wherein the broker system provides a bridge inbound queue and a bridge outbound queue to enable the local node and the bridge system to exchange messages.

11. The message interface system of claim 10 wherein the bridge system sends to the local node a queue request message for the identification of an inbound queue and outbound queues and receives from the local node an indication of the inbound queue and the outbound queues.

12. The message interface system of claim 7 wherein the message interface system connects to multiple local nodes.

13. The message interface system of claim 7 wherein the secure zone system includes a failover reverse proxy server.

14. The message interface system of claim 7 further comprising a failover bridge system.

15. The message interface system of claim 7 wherein the local node and the remote node implement a flow of a Corda network.

16. The message interface system of claim 7 wherein the local node queues outbound messages if the message interface system is unavailable.

17. The message interface system of claim 7 wherein the broker system creates the outbound queue and the inbound queue in response to a request of the local node.

18. The message interface system of claim 7 wherein the reverse proxy server validates the bridge system.

19. The message interface system of claim 7 wherein the reverse proxy server, upon receiving an inbound message, validates that the inbound message is directed to a valid inbound queue.

20. A secure zone system supporting communications between a local node and a remote node using a message queuing protocol, the secure zone system comprising:

a reverse proxy server that receives a secure zone signing key, receives an inbound connection from the remote node through an external firewall, establishes a connection with the remote node using the secure zone signing key, receives inbound messages from the remote node through the external firewall, and sends the inbound messages to the local node through an internal firewall, wherein the reverse proxy server does not store state relating to prior inbound messages; and a proxy server that sends an inbound connection to the remote node through the external firewall, establishes a connection with the remote node, receives outbound messages from the local node through the internal firewall, and sends the outbound messages to the remote node via the external firewall.

21. The secure zone system of claim 20 wherein the message queuing protocol is compatible with an Advanced Message Queuing Protocol ("AMQP").

22. The secure zone system of claim 21 wherein the secure zone system interfaces with an AMQP bridge manager through the internal firewall and wherein the AMQP bridge manager interfaces with an AMQP broker.

23. The secure zone system of claim 22 wherein the local node sends outbound messages to and receives inbound messages from the remote node via the AMQP broker.

24. The secure zone system of claim 20 wherein the secure zone system includes a failover reverse proxy server.

25. The secure zone system of claim 20 wherein the local node and the remote node implement a flow of a Corda network.

* * * * *